United States Patent [19]

Butler

[11] 4,086,679

[45] May 2, 1978

[54] CARPET RETAINERS

[75] Inventor: Richard William Butler, St. Clair Shores, Mich.

[73] Assignee: USM Corporation, Farmington, Conn.

[21] Appl. No.: 705,553

[22] Filed: Jul. 15, 1976

[51] Int. Cl.[2] .............................................. A47G 27/04
[52] U.S. Cl. ....................................... 16/4; 296/1 F; 85/80
[58] Field of Search ...................... 16/4, 7, 16; 85/80; 52/273; 296/1 R, 1 F; 280/169; 24/255 SL, 248 SL, 249 SL, 73 PF; 248/73, 74 PB

[56] References Cited

U.S. PATENT DOCUMENTS

| | | | |
|---|---|---|---|
| 1,206,759 | 11/1916 | Hanauer | 16/4 UX |
| 2,313,812 | 3/1943 | Duffy | 296/1 R |
| 2,657,948 | 11/1953 | Sturtevant | 296/1 R |
| 2,779,048 | 1/1957 | Larabell | 16/4 |
| 3,015,869 | 1/1962 | Rapata | 248/71 UX |
| 3,049,585 | 8/1962 | Cochran | 248/74 PB |
| 3,074,675 | 1/1963 | Brown | 248/74 PB |
| 3,137,027 | 6/1964 | Birkle | 160/345 X |
| 3,208,095 | 9/1965 | Hill | 52/273 |
| 3,423,055 | 1/1969 | Fisher | 248/73 |

FOREIGN PATENT DOCUMENTS

| | | | |
|---|---|---|---|
| 1,022,820 | 3/1966 | United Kingdom | 248/74 PB |

*Primary Examiner*—Andrew V. Kundrat
*Attorney, Agent, or Firm*—Aubrey C. Brine; Richard B. Megley; Vincent A. White

[57] ABSTRACT

A one piece resilient fastener is provided for retaining an edge portion of a fabric or other sheet material in clamping engagement between a panel and a trim plate. The invention in its preferred embodiment, is employed in combination with an automobile carpet and serves to retain the carpet in proper location on the automobile floor panel prior to installation of the scuff-plate and to provide a spacer member between the plate and panel after the plate is installed.

5 Claims, 4 Drawing Figures

CARPET RETAINERS

BACKGROUND OF THE INVENTION

The present invention relates to fasteners, and more particularly to a fastener for retaining an edge portion of a fabric or other sheet material in clamping engagement between a panel and a trim plate.

In the production of automobiles, and particularly the more expensive models, it is customary to provide a fabric carpet which covers the floor panels to provide a pleasing and luxurious appearance. The carpet is generally chosen of a color which blends with the interior colors of the automobile, and is attached to the automobile floor panels during the assembly of the automobile as a permanent installation. One of the attach points for the carpet is provided at the door openings of the body wherein a sheet metal element, referred to in the trade as a scuff-plate, is installed over the edge of the carpet to retain the carpet in place adjacent the floor panel. The scuff-plate is effective to obscure the rough edges of the carpet, and in addition to firmly clamp the carpet between the scuff-plate and the floor panel.

Presently, in the mass production of automobiles, the carpets are generally installed at one station on the production line, by workmen placing the carpet on the floor panel in its proper position, and at this station, no fastening tools are provided, as the carpet is not attached to the floor. At a later station, the scuff-plate is applied and screws are inserted through the scuff-plate into the sheet metal floor panel of the vehicle to provide attachment of the carpet to the floor.

One of the problems encountered in this operation is that of keeping the carpet in place prior to installation of the scuff-plate. Should the carpet be pulled or skewed from its original position prior to installation of the scuff-plate, the plates may be installed without retaining an adequate edge portion of the carpet between the plate and the floor panel to prevent the carpet being pulled away during use, or further time and labor must be expended to properly locate the carpet.

An object of the present invention, therefore, is to provide a simple fastener which may be installed without the use of tools and is effective to retain the edge portion of a fabric or sheet material positioned adjacent a panel.

A further object of the invention is to provide a fastener of the above type, which is a unitary structure that is simple to use and inexpensive to manufacture.

SUMMARY OF THE INVENTION

The above objects, and other objects which will become apparent as the description proceeds, are accomplished by providing a one piece resilient fastener for retaining an edge portion of a sheet adjacent a panel which fastener comprises a body portion having an opening formed therethrough. An elongated flange extends outwardly from one side of the body portion adjacent one end of the opening and substantially normal to the opening and an elongated cover portion hinged at the opposite side of the body portion from the flange is movable to a position overlying the flange. Means disposed on the body portion is effective for locking the cover portion in a position overlying the flange and means disposed adjacent the opposite end of the opening from the flange is effective to connect the fastener to the panel. A plurality of oppositely facing teeth may be provided on the flange and the cover portion to retain the sheet or carpet in locking engagement therebetween.

BRIEF DESCRIPTION OF THE DRAWING

For a complete understanding of the invention, reference should be made to the drawing showing an embodiment to be described herein, in which.

DESCRIPTION OF THE PREFERRED EMBODIMENT

Figure 1:
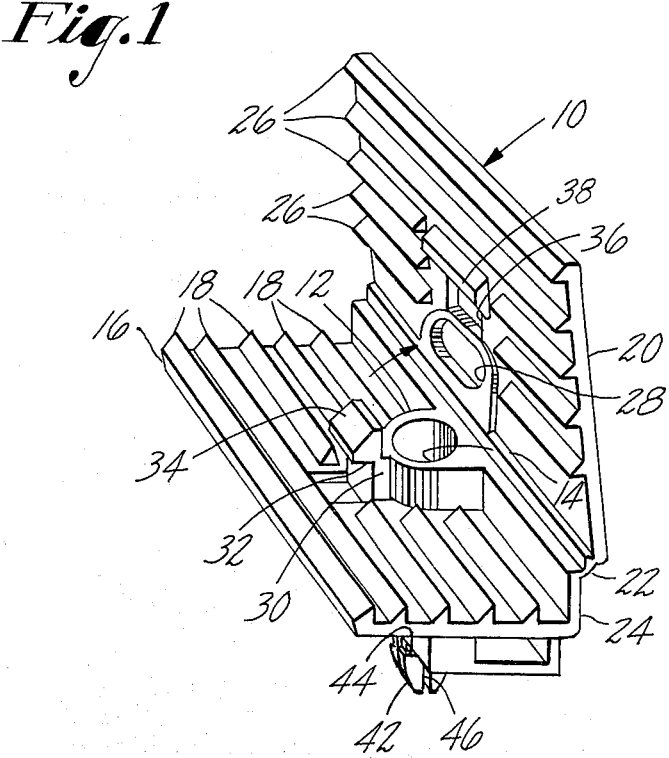
FIG. 1 is an elevational perspective view showing a preferred embodiment of the invention.
Figure 2:
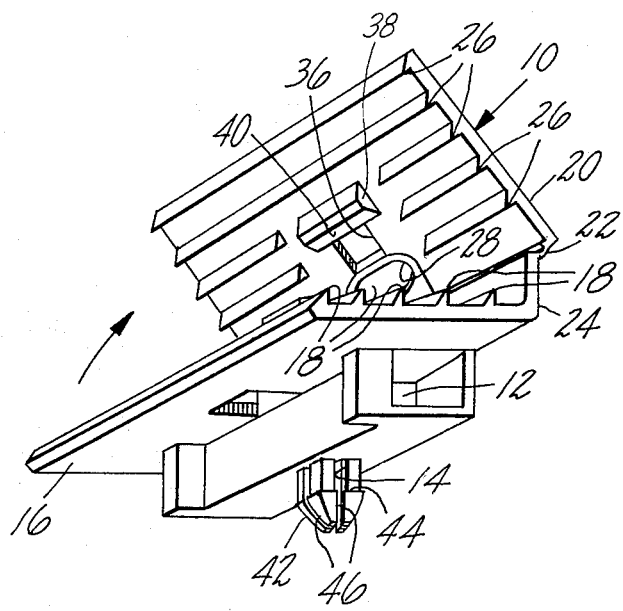
FIG. 2 is a bottom perspective view showing details of the structure of FIG. 1.
Figure 3:
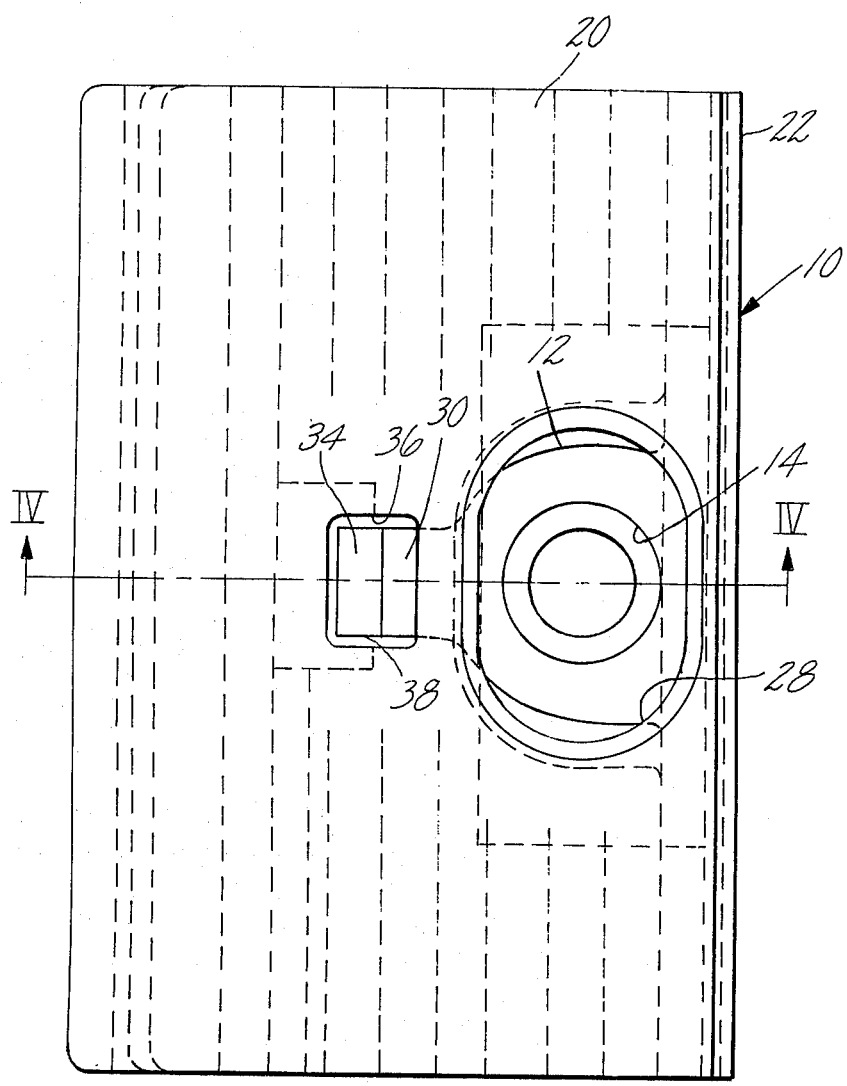
FIG. 3 is a top plan view taken on an enlarged scale showing further details of the structure of FIGS. 1 and 2.

Referring now to the drawings, and in particular to FIGS. 1, 2 and 3, there is shown a one piece resilient fastener 10 which may be molded from a high impact polypropylene or other suitable plastic material by conventional molding techniques. The fastener 10 is provided with a body portion 12 having a circular bore, or opening 14 formed therein.

Adjacent the upper end of the opening 14 (as shown in FIG. 1) there is disposed an elongated flange 16. The flange 16 extends substantially at right angles to the axis of the bore or opening 14 and is provided with a plurality of teeth 18 extending upwardly from the top surface of the flange and lengthwise of the flange.

At the opposite side of the body portion 12 from the flange 16 there is pivotably located an elongated cover portion 20 substantially the same plan form dimensions as the flange 16. The one piece molded construction of the fastener 10 and the resilient material from which it is fabricated, provides a relatively thin hinge section 22 which serves to connect the cover portion 20 to an upstanding leg 24 connecting an edge of the flange 16 with the body portion 12. The cover portion 20 is provided with a plurality of teeth which lie in opposed facing relation with the teeth 18 when the cover portion is moved to a position overlying the flange 16. The teeth 26 and the teeth 18 are similar in construction and have their points directed toward the body portion 12 when so positioned in facing relation. An elongated opening 28 is provided in the cover portion 20 and located on the cover portion to fall in alignment with the opening 14 when the cover portion overlies the flange 16.

As the best shown in FIG. 1, on the side of the body portion 12 from which the flange 16 projects, an upstanding finger 30 protrudes from the base of the upper surface of the flange to a position above the body portion. The finger 30 has a shoulder formed therein with a surface 32 of the shoulder facing the flange 16. A camming surface 34 extends from a point adjacent the shoulder surface 32 to the end of the finger 30 and is sloped at an angle defined by a maximum width of the finger 30 adjacent the shoulder surface 32 and a minimum width of the finger at its end.

The cover portion 20 is provided with a rectangular opening 36 formed to substantially align with the finger 30 when the cover portion 20 is positioned overlying the elongated flange 16. One edge of the opening 36 is formed with a lip 38. The lip 38 has a camming surface 40 facing downwardly towards the flange 16 and aligned to contact the camming surface 34 of the finger 30.

At the opposite end of the body portion 12 from that of the flange 16 or the cover portion 20, means are provided for retaining the fastener 10 in an opening provided in the vehicle floor. In the embodiment shown, an elongated boss 42 extends downwardly from the body portion 12 such that the bore or opening 14 extends centrally therethrough. The boss 42 tapers from a minimum dimension adjacent to its end toward a shoulder portion 44 defining the maximum dimension of the boss. The shoulder portion 44 has a tapered surface extending towards the body portion 12 which terminates at a portion of the boss which extends between the shoulder portion 44 and the body portion 12, which portion is of substantially uniform cross-section. A plurality of slots 46 extends from the end of the boss 42 to the body portion 12, permitting flexure of the boss inwardly of the defined dimensions of the opening 14.

Figure 4:
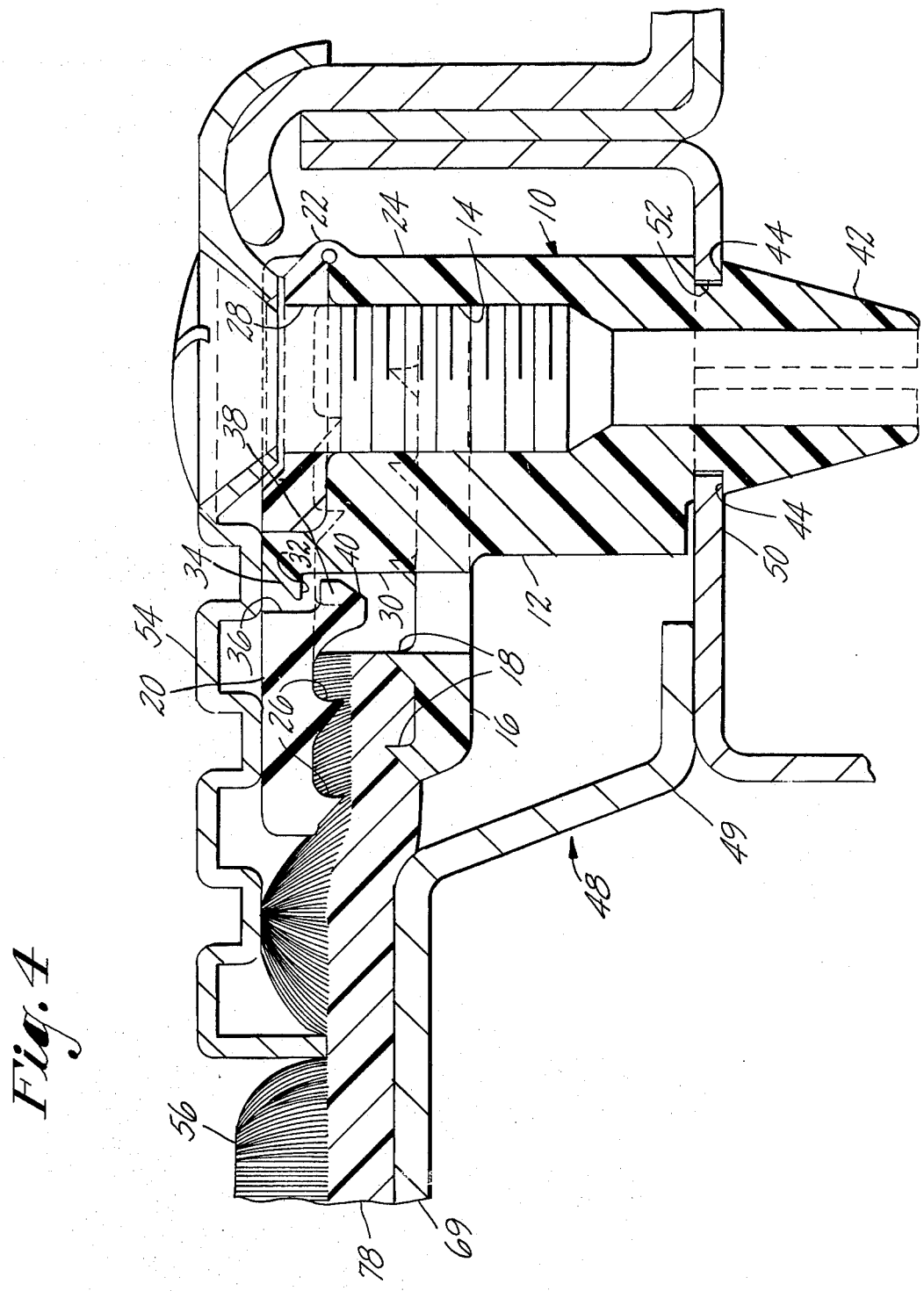
FIG. 4 is a sectional elevational view taken along the line IV—IV of FIG. 3 showing the structure of FIGS. 1, 2 and 3 and further showing details of the related structure, with the embodiment in use.

Referring now to FIG. 4, there is shown a typical automotive construction wherein a floor 48 is formed comprising a plurality of welded members located adjacent the door opening. The floor 48 comprises an upper panel 49 and a lower panel 50 forming a slight groove in the floor adjacent the door opening. The lower panel 50 has a plurality of openings 52 formed therein for attaching a scuff-plate 54 extending inwardly from the door opening.

As the automobile body proceeds along a production line, a carpet 56 is placed, and properly located in position on the floor 48 of the automobile, with the edges aligned adjacent the door openings, and at the other critical points in the body assembly. In accordance with this invention, a plurality of fasteners 10 are then installed in the floor 48 by forcing the elongated boss 42 of each through the opening 52 of the panel 50. With the slots 46 provided, the boss 42 flexes inwardly upon itself, and is easily forced through the opening 52 until the shoulder portion 44 extends beyond the lower panel 50 to inhibit removal from the panel. The fastener 10 is installed as described above with the elongated cover portion 20 open or in the position shown in FIGS. 1 and 2. The carpet 56 is then placed over the flange 16 and the cover portion 20 brought to the position overlying the flange, as shown in FIG. 4. In so doing, the camming surface 34 contacts the camming surface 40 forcing the resilient finger 30 back to the edge of the opening 36 opposite the lip 38. The finger 30 then continues into the opening 36 and snaps into position with the lip 38 underlying the shoulder surface 32 of the finger. The carpet 56 is now firmly retained between the teeth 18 and 26 and remains so until the installation of the scuff-plate 54.

At a further station along the production line, a scuff-plate 54 is placed over the carpet 56 and the fasteners 10 and the screws inserted into the openings in the scuff-plate and are received in engagement in the fastener 10.

In addition to retaining the carpet 56 in position until the scuff-plate 54 is installed, the fasteners 10 effectively provide a spacer between the scuff-plate and the panel 50, preventing the scuff-plate from buckling when it is fastened to the panel 50 through the fastener 10.

The fastener 10 provides many advantages, particularly when employed in conjunction with mass production, or assembly line techniques. The structure being of one piece construction does not require that separate mating parts be stored and assembled at the point of assembly. In addition, the fastener 10 is easily installed without employing special tools, and does not require a special technique or an experienced workman to employ the device.

Having thus described my invention what I claim as new and desire to secure by Letters Patent of the United States is:

1. A one piece resilient fastener for retaining an edge portion of a sheet adjacent a panel comprising a body portion having an opening formed therethrough,
   an elongated flange extending outwardly from one side of said body portion adjacent one end of said opening and substantially normal to said opening and spaced from one end of said body,
   an elongated cover portion hinged at the opposite side of said body portion from said flange side and movable to a position overlying said flange and said body end portion,
   an opening formed in said cover portion in alignment with said opening in said body portion positioned overlying said flange and said body portion,
   means disposed on said body portion for locking said cover portion in a position overlying said flange and body portion,
   means for connecting said fastener to said panel comprising an elongated boss extending from said body portion and in which the opposite end of said opening from said body is formed contiguous the opening in said body,
   said boss having a shoulder formed thereon spaced from the end of said boss, said shoulder being of a greater width than either end of said elongated boss, and
   a slot extending the length of said boss from the outer surface of said boss into said opening,
   whereby said shoulder is flexed to provide a lesser width when said boss is introduced into an opening in said panel and returns to its initial width dimension after passing through the panel opening to initially retain said fastener on said panel, and said cover portion opening and said body portion opening through said boss are aligned with the cover in the closed position for insertion of a male fastener therein.

2. The fastener of claim 1, wherein said flange and said cover portion are each provided with a plurality of opposed teeth with said cover portion positioned overlying said flange.

3. The fastener of claim 2 wherein said locking means comprises a resilient finger disposed on said body portion and extending from adjacent said flange toward said cover portion in a positon overlying said flange,
   said finger having a shoulder formed near the end thereof, and
   an opening formed in said cover portion for receiving said finger therethrough when positioned overlying said flange,
   said opening being formed by said cover portion to form a lip adjacent thereto in alignment with and opposed to said shoulder finger extending into said opening,
   whereby said finger is caused to flex when introduced into said cover portion opening and remains in the flexed state until said shoulder is moved past said lip to thereby retain said flange and said cover portion in locking engagement.

4. The fastener of claim 1, wherein said locking means comprises a resilient finger disposed on said body portion and extending from adjacent said flange toward said cover portion in a position overlying said flange,
    said finger having a shoulder formed near the end thereof, and
    an opening formed in said cover portion for receiving said finger therethrough when positioned overlying said flange,
    said opening being formed by said cover portion to form a lip adjacent thereto in alignment with and opposed to said shoulder with said finger extending into said opening,
    whereby said finger is caused to flex when introduced into said cover portion opening and remains in the flexed state until said shoulder is moved past said lip to thereby retain said flange and said cover portion in locking engagement.

5. The fastener of claim 1, which is formed of a polypropylene material.

* * * * *

UNITED STATES PATENT OFFICE
CERTIFICATE OF CORRECTION

Patent No. 4,086,679     Dated May 2, 1978

Inventor(s) Richard William Butler

It is certified that error appears in the above-identified patent and that said Letters Patent are hereby corrected as shown below:

Column 4, Line 20, after the word "portion" insert the words --with said cover portion--

Column 4, Line 42, after the word "with" delete "the" and insert the word -- said --.

Column 4, Line 60, after the word "shoulder" insert the words --with said--

Signed and Sealed this

Twenty-sixth Day of September 1978

[SEAL]

Attest:

RUTH C. MASON
Attesting Officer

DONALD W. BANNER
Commissioner of Patents and Trademarks